(12) United States Patent
Nakamura

(10) Patent No.: US 7,196,754 B2
(45) Date of Patent: Mar. 27, 2007

(54) LIQUID CRYSTAL DISPLAY APPARATUS AND MANUFACTURING METHOD OF SAME

(75) Inventor: Wataru Nakamura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 42 days.

(21) Appl. No.: 10/413,214

(22) Filed: Apr. 15, 2003

(65) Prior Publication Data

US 2003/0202138 A1  Oct. 30, 2003

(30) Foreign Application Priority Data

Apr. 26, 2002 (JP) ............................ 2002-127636
Feb. 21, 2003 (JP) ............................ 2003-045076

(51) Int. Cl.
*G02F 1/1335* (2006.01)

(52) U.S. Cl. ..................................... 349/113; 349/106

(58) Field of Classification Search ................ 349/113, 349/106
See application file for complete search history.

(56) References Cited

U.S. PATENT DOCUMENTS

| | | | |
|---|---|---|---|
| 5,506,707 A * | 4/1996 | Segawa ....................... | 349/139 |
| 6,016,178 A | 1/2000 | Kataoka et al. | |
| 6,130,736 A * | 10/2000 | Sasaki et al. ............... | 349/122 |
| 6,195,140 B1 * | 2/2001 | Kubo et al. ................. | 349/44 |
| 6,614,496 B1 * | 9/2003 | Song et al. ................. | 349/114 |
| 6,697,138 B2 * | 2/2004 | Ha et al. .................... | 349/114 |

FOREIGN PATENT DOCUMENTS

| | | |
|---|---|---|
| JP | 2000-162625 | 6/2000 |
| JP | 2000-187209 | 7/2000 |
| JP | 2000-305110 | * 11/2000 |

OTHER PUBLICATIONS

Korean Office Action mailed Aug. 25, 2005 (w/English translation thereof).
KR 1998-023974 dated Jul. 6, 1998 (U.S. counterpart application 6,016,178 listed above).

* cited by examiner

*Primary Examiner*—Dung T. Nguyen
(74) *Attorney, Agent, or Firm*—Nixon & Vanderhye P.C.

(57) ABSTRACT

By using a plastic substrate as a substrate, a lighter weight, improved shock resistance, and a lower cost are realized, while preventing deterioration of quality of the display image due to expansion and contraction of the substrate. A liquid crystal display apparatus (LCD) is provided with reflective electrodes 13 formed on a plastic substrate 2, color filter layers 14 formed on the reflective electrodes 13, a transparent conductive films 15 electrically connected with the reflective electrodes 13 in an area around the color filter layer 14. In the LCD, a distance between an edge of each reflective electrode 13 and an edge of the color filter layer 14 associated therewith is set based on an amount of expansion and contraction of the substrate 2, which are caused in a step of forming the color filter layers 14 and an amount of expansion and contraction of the substrate 2, which are caused in a step of forming the transparent conductive electrodes 15.

31 Claims, 8 Drawing Sheets

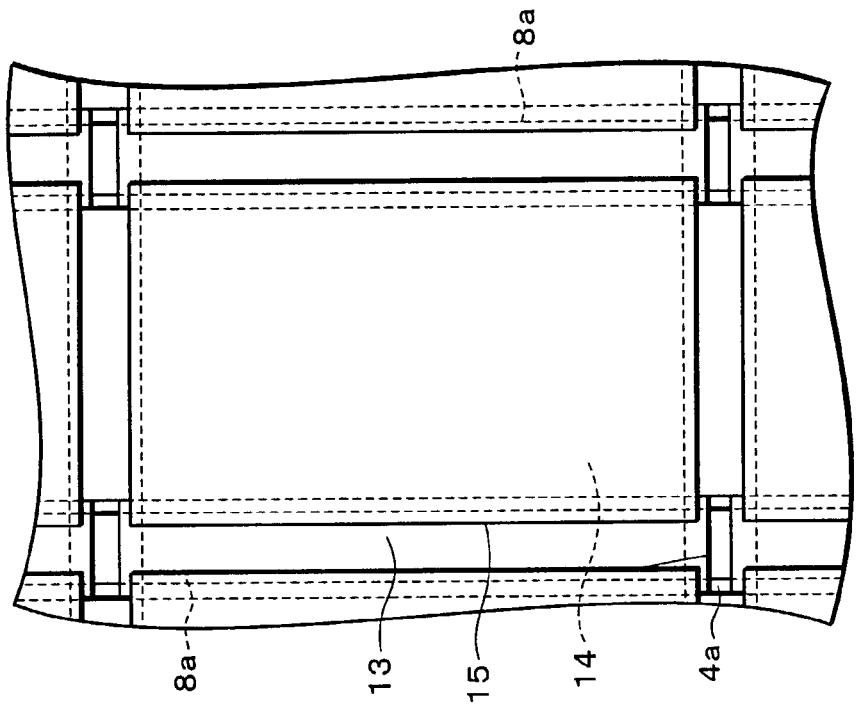
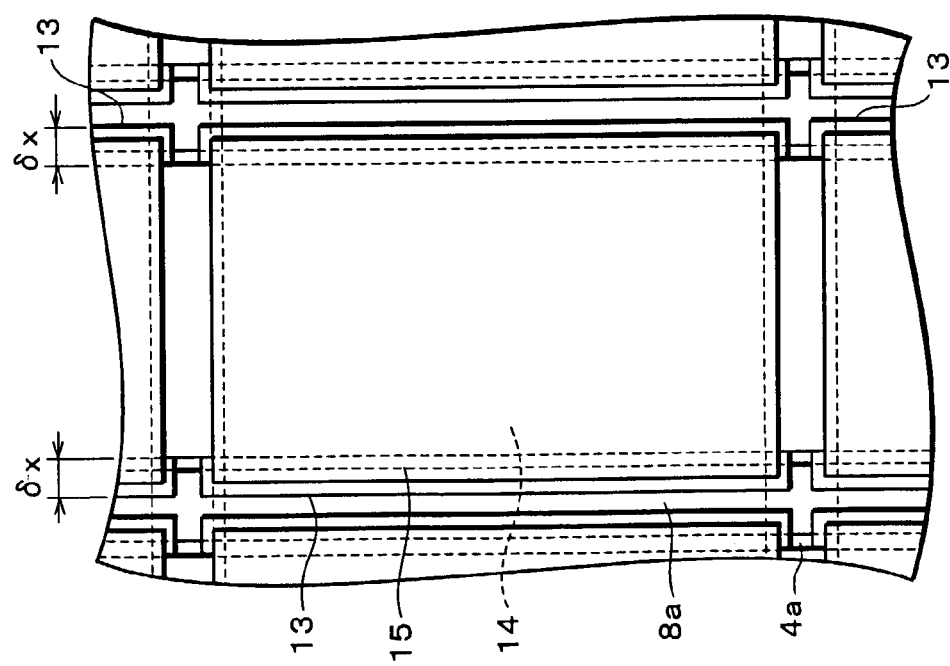

LIQUID CRYSTAL DISPLAY APPARATUS AND MANUFACTURING METHOD OF SAME

FIELD OF THE INVENTION

The present invention relates to a liquid crystal display apparatus for displaying by making use of incident light externally entering thereto, and a manufacturing method thereof.

BACKGROUND OF THE INVENTION

A thin film transistor has been well known as a thin film lamellar device for liquid crystal display apparatuses (hereinafter, just referred to as LCDs). By equipping an LCD of an active matrix type with the thin film transistor as a switching element, it is possible to realize high-speed moving picture and subtle display, which are properties required in the LCD. Note that the LCD of the active matrix type is an LCD in which a switching element is provided for each pixel so as to control electric charges applied on pixel electrodes.

The LCD using the thin film transistor is so arranged as to have a glass substrate or a quartz substrate in order to be tolerant against thermal process, chemicals and the like in forming the thin film transistor.

Especially, in a portable information terminal, which is in increasing demand recently, the LCD using the thin film transistor is provided. The use of a reflective LCD as the LCD in the portable information terminal eliminates the need of a back light and reduces power consumption in the portable information terminal.

Note that the reflective LCD is an LCD provided with (i) a first insulating substrate including scanning lines and signal lines crossing each other in matrix, a thin film transistor and a reflective electrode, and (ii) a second transparent insulating substrate including a color filter layer, a black matrix, and a counter electrode, the first and second insulating substrates being pasted together face-to-face (panel alignment), and (iii) a twist nematic (TN) liquid crystal filled in-between the first and second insulating substrates.

The LCD using the thin film transistor is applied in various fields. The various application of the LCD verifies required characteristics of the same. Especially, it is important to improve the LCD to have lighter weight, better shock resistance, or lower cost, because the demand of the LCD for use in the portable information terminal is increasing.

However, in the conventional LCD in which the thin film transistor is provided on the glass substrate or quartz substrate, there is a limit in thickness of the substrate. The limit prohibits the conventional LCD from having a substrate thinner than the limit. Moreover, if a thinner glass substrate or the quartz substrate is used for reducing the weight of the LCD, the substrate becomes fragile and less resistant against shock. Further, cost of the glass substrate or quartz substrate gives a limit in cost reduction of the LCD.

In short, it is difficult to improve the thin film transistor using the conventional glass substrate or the like for lighter weight, better shock resistance, and lower cost, which are required characteristics for the LCD.

For realizing lighter weight, better shock resistance, an lower cost in the LCD, there has been an attempt to use a plastic substrate in a thin film transistor.

Incidentally, the conventional reflective LCD has the following problems.

Namely, in the conventional reflective LCD, it is necessary to accurately paste the first insulating substrate having the thin film transistor and the second insulating substrate having the color filter layers together in order to prevent light leakage and color blurring due to incorrect positioning in bonding.

As solution for this, Japanese Publications of Unexamined Patent Application, Tokukai No. 2000-162625 (published on Jun. 16, 2000), and Tokukai No. 2000-187209 (published on Jul. 4, 2000) disclose a color filter layer-on-array-structure in which the color filter layers and the thin film transistors are formed on an insulating substrate.

According to methods described in the publications, it is possible to form the color filter layers on the substrate having the thin film transistors. Therefore, according to the methods, it is possible to manufacture the LCD without a fear of the incorrect positioning in pasting the first insulating substrate having the thin film transistor with the second insulating substrate including the color filter layers.

However, if the plastic substrate is used as the insulating substrates, the plastic substrate is expanded and contracted by heat and humidity in a step of forming the color filter layers, or a step of forming the pixel electrode.

In short, in the prior arts disclosed in the publications, if the plastic substrate is used as the insulating substrates, it is difficult to attain accurate matching in forming the color filter layers on the reflective electrode on the substrate. This leads to incorrect positioning, which causes light leakage and color blurring, thereby deteriorating display image in quality.

In other words, it is difficult to improve the conventional reflective LCD in cost or the like by using the plastic substrate while preventing deterioration of the display image in quality.

SUMMARY OF THE INVENTION

The present invention, in view of the foregoing problems, has an object to provide an LCD and a manufacturing method thereof, the LCD having a lighter weight, improved shock resistance, and lower cost, while preventing quality deterioration of a display image due to expansion and contraction of a substrate.

In order to solve the problem, a liquid crystal display apparatus of the present invention is so arranged as to include a reflective electrode on a substrate; a color filter layer on the reflective electrode; and a transparent electrode on the color filter layer, the transparent electrode being electrically connected with the reflective electrode in an area around the color filter layer.

In order to solve the problem, a manufacturing method of a liquid crystal display apparatus of the present invention is so arranged as to include the steps of: forming a reflective electrode on a substrate; forming a color filter layer on the reflective electrode; and forming a transparent electrode so that the transparent electrode is, in an area around the color filter layer, electrically connected with the reflective electrode.

With the above arrangement, the reflective electrode and the transparent electrode are electrically connected in the area around the color filter layer. Thus, even if incorrect positioning is caused due to expansion and contraction of the substrate during the step of forming the color filter, it is possible to secure the electrical connection between the reflective electrode and the transparent electrode.

With this arrangement, it is possible to provide, by using the plastic substrate as the substrate, such an LCD having a lighter weight, improved shock resistance, and lower cost, while preventing quality deterioration of a display image due to expansion and contraction of a substrate.

For a fuller understanding of the nature and advantages of the invention, reference should be made to the ensuing detailed description taken in conjunction with the accompanying drawings.

BRIEF DESCRIPTION OF THE DRAWINGS

FIG. 3(a) is a plan view illustrating how a color filter layer is overspread on a plurality of reflective electrodes in the LCD of FIG. 1.

FIG. 3(b) is a plan view illustrating a case where the reflective electrodes are patterned only along a direction in which gate lines are positioned in the LCD of FIG. 1.

DESCRIPTION OF THE EMBODIMENTS

[First Embodiment]

Referring to FIGS. 1 to 4, an embodiment of the present invention will be described below.

Figure 1:
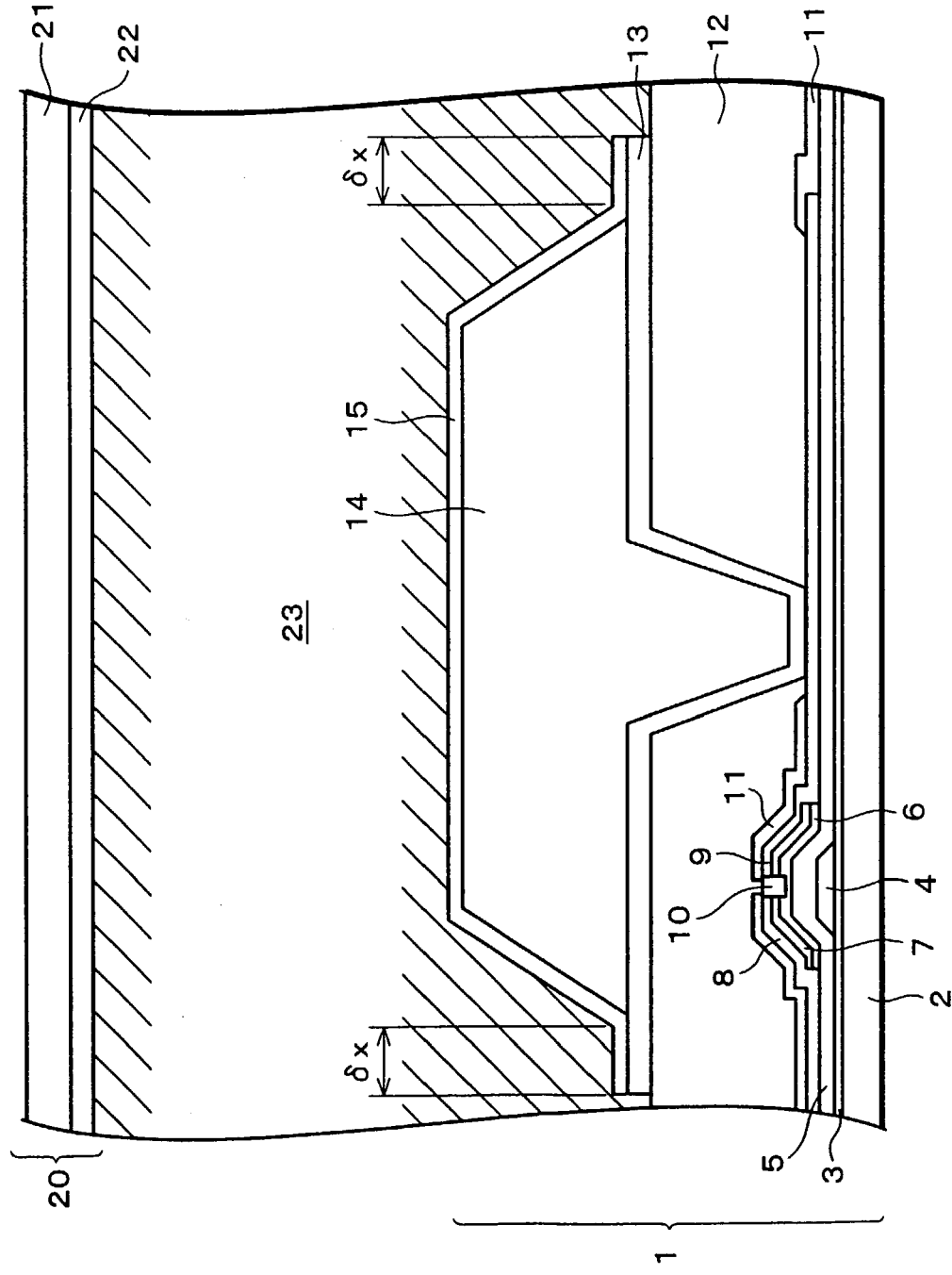
FIG. 1 is a cross-sectional view illustrating an embodiment of an LCD of the present invention.

As shown in FIG. 1, an active matrix substrate 1 for use in an LCD of the present embodiment is provided with a plastic substrate (substrate) 2, an inorganic layer 3, gate electrodes 4, a gate insulting film 5. Further, the active matrix substrate 1 is provided with, for each gate electrode 4, an intrinsic semiconductor film 6, a conductive semiconductor film 7, a source electrode 8, a drain electrode 9, a channel section 10, a protective insulating film 11, an interlayer insulating film 12, a reflective electrode 13, a color filter layer 14, and a transparent electrode 15.

The plastic substrate 2 has a thickness of about 0.2 mm and is made of polyether sulfone. In addition, the plastic substrate 2 may be transparent or semitransparent as long as the plastic substrate 2 is tolerant against a maximum temperature in steps of manufacturing the active matrix substrate 1. Moreover, the plastic substrate 2, which is riot limited to polyether sulfone, may be a resin such as polyethylene telephthalate, polyallylate, polycarbonate, polyethylene, polymethyl methacrylate, polyimide, epoxy resin, or the like.

The inorganic layer 3 has a thickness of about $1.5 \times 10^{-5}$ m (1500 Å), and made of $Si_xN_y$. Further, the inorganic layer 3 provides the following benefits: (1) to improve cohesion of the gate lines (scanning lines) formed on the inorganic layer 3; (2) to prevent gases, impurities or the like from passing through the plastic substrate 2, the gases, impurities and the like deteriorating the LCD in display quality; and (3) to significantly reduce expansion and contraction of the plastic substrate 2 due to water.

Moreover, the inorganic layer 3, which is not limited to $Si_xN_y$, may be made of an insulating raw material such as $Si_x$, Si:O:N, Si:O:H, Si:N:H, Si:O:N:H, and $Si_3N_4$, or the like.

The gate electrodes 4 have a thickness of about $2.0 \times 10^{-5}$ m (2000 Å), and are made of metal such as aluminum (Al) or the like. The gate insulating film 5 is formed on the gate electrodes 4, and made of $SiN_x$.

The intrinsic semiconductor film 6 is formed on each gate electrode 4 via the gate insulating film 5, and made of a non-doped a-Si film and in an island shape.

The conductive semiconductor film 7 is formed on the intrinsic semiconductor film 6, and made of a doped a-Si film of n+ type. Moreover, the conductive semiconductor film 7 is separated by the channel section 10 on the intrinsic semiconductor film 6.

On the separated conductive semiconductor film 7, the source electrode 8 made of a Ti film, and the drain electrode 9 are formed.

The protective insulating film 11 is formed on the source electrode 8 and the drain electrode 9. The interlayer insulating film 12 is formed on the protective insulating film 11, and made of an acrylic photosensitive resin.

The reflective electrode 13 is made of metal such as Al or the like, and is formed on the interlayer insulating film 12. Moreover, the color filter layer 14 is made of an acrylic resin in which pigment is dispersed, and is formed on the reflective electrode 13.

Further, the transparent electrode 15, which is overlaid on the color filter layer 14, is transparent conductive films made of ITO (Indium Tin Oxide). Moreover, peripheral part of the transparent electrode 15 is electrically connected with the reflective electrode 13, respectively. Note that an alignment layer (not shown) made of a polyimide resin is formed on the transparent electrode 15.

Next, described is a counter substrate 20, which is another substrate provided in the LCD of the present embodiment. The counter substrate 20 used in the LCD of the present embodiment is, as shown in FIG. 1, so positioned as to face the active matrix substrate 1 and is provided with a plastic substrate 21 and a counter electrode 22.

The plastic substrate 21 has a thickness of about 0.2 mm, and is made of polyether sulfone. The plastic substrate 21, which is not limited to polyether sulfone, may be a resin such as polyethylene telephthalate, polyallylate, polycarbonate, polyethylene, polymethyl methacrylate, polyimide, epoxy resin, or the like.

Note that the counter electrode 22 is a transparent conductive film formed on the plastic substrate 21 and made of ITO. Moreover, an alignment layer (not shown) made of a polyimide resin is formed on the counter electrode 22.

The active matrix substrate 1 and the counter substrate 20 respectively having the above arrangements are pasted together via a sealing agent applied on that area of the active matrix substrate 1, which is around where the reflective electrodes 13 and the transparent electrodes 15 are provided. Further, liquid crystal 23 is filled in between the active matrix substrate 1 and the counter substrate 20. Thereby the LCD of the present embodiment is formed.

Figure 2:
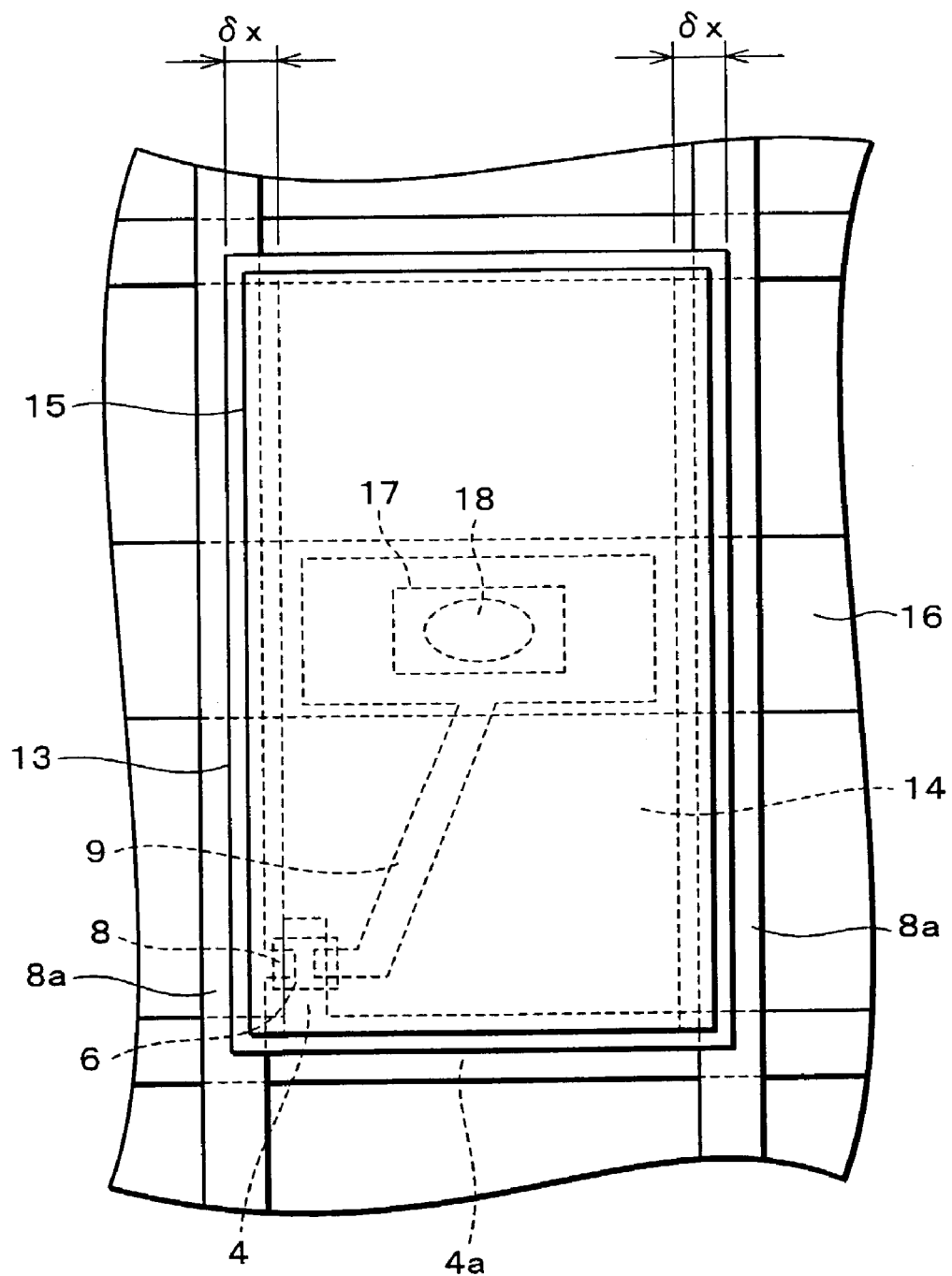
FIG. 2 is a plan view of the LCD of FIG. 1.

Next, a surface arrangement of the active matrix substrate 1 having the above arrangement will be explained. As shown in FIG. 2, the active matrix substrate 1 is provided with a plurality of the gate electrodes 4, a plurality of gate lines 4a, and supplement capacitor lines 16.

Moreover, the active matrix substrate 1 is provided with source lines 8a, which are respectively connected with a plurality of the source electrodes 8.

The gate lines 4a and source lines 8a are so located as to cross each other at the right angle while having the gate insulating film 5 (not shown). Further, the supplement capacitor lines 16 are so provided as to cross the source lines 8a.

Moreover, the drain electrodes 9 are extended to top of the supplement capacitor lines 16 so that the drain electrodes 9 overlap the supplement capacitor lines 16 while the inorganic layer 3 is sandwiched therebetween. In this way, the drain electrodes 9 form supplement capacitor.

Moreover, each reflective electrode 13 is electrically connected respectively with the drain electrode 9 via contact holes 17 and 18, which are respectively provided in the protective insulating film 11 (see FIG. 1) and the interlayer insulating film 12 (see FIG. 1).

By arranging the gate electrodes 4, the gate lines 4a, source electrodes 8 and the source lines 8a as described above, a thin film transistor as a switching element is formed. Note that the interlayer insulating film 12 (see FIG. 1) is formed on the thin film transistor.

Moreover, the color filter layer 14 is so formed as to be along a direction in which the source lines 8a are provided, and to cover areas in which the reflective electrodes 13 and transparent electrodes 15 are formed.

Moreover, the color filter layer 14 has a width narrower than that of a pixel electrode formed by including the reflective electrode 13 and the transparent electrode 15. Specifically, right and left edge portions of the color filter layers 14 respectively form alignment margins δx, which start from right and left edge portions of the pixel electrodes respectively. Note that the alignment margins δx are distances between edges from the reflective electrodes 13 and edges of the color filter layers 14. How the alignment margins δx are set will be described later.

In this way, at the right and left edge portions of the color filter layers 14, it is possible to electrically connect the transparent electrodes 15 with the reflective electrodes 13.

Next, an example of a manufacturing method of the LCD of the present embodiment is explained.

Firstly, on the plastic substrate 2 made of polyether sulfone and having a size of 360 mm in length, 465 mm in width, and 0.2 mm in thickness, the inorganic layer 3 made of $Si_xN_y$ or the like is so formed as to have a thickness of $1.5 \times 10^{-5}$ m (1500 Å) by the sputtering method at a film formation temperature of 190° C. it is necessary that the film formation temperature for the formation of the inorganic layer 3 be lower than a temperature at which the plastic substrate 2 is deformed by heat.

Next on the inorganic layer 3, a metal film made of Al or the like is so formed as to have a thickness of $2.0 \times 10^{-5}$ m (2000 Å) by the sputtering method at a film formation temperature of 190° C. Thereafter, the gate line 4a and the gate electrode 4 connected thereto are formed through a step of photolithography and a step of patterning. Note that the metal film is not limited to Al, and may be made of an alloy of Al, Ta, TaN/Ta/TaN, or Ti/Al/Ti.

Next, on the gate electrode 4 and the gate line 4a, the gate insulating film 5 made of $SiN_x$ is formed by the plasma Chemical Vapor Deposition (CVD) method at a film formation temperature of 220° C.

Next, by the plasma CVD method, the intrinsic semiconductor film 6 made of the non-doped a-Si film or the like and the conductive semiconductor film 7 made of a-Si film of n+ type or the like are sequentially formed at a film formation temperature of 220° C. Then, through a step of photolithography and a step of pattering, the intrinsic semiconductor film 6 is patterned in an island-like shape, thereby forming a semiconductor layer including the intrinsic semiconductor films 6 and the conductive semiconductor films 7.

Next, on the semiconductor layer and the gate insulating film 5 covering the gate electrode 4, a Ti film, which is an insulating metal film, is formed by the sputtering method at a film formation temperature of 28° C. Then, through a step of photolithography, the source line 8a, the source electrode 8, and the drain electrode 9 are formed. Note that the raw materials of the source line 8a, source electrode 8 and drain electrode 9 are not limited to Ti and may be Mo, Al/Ti, or Ag.

Next, by using the drain electrode 9 made of Ti and the source electrode 8 as masks, portion above the a-Si film of the n+ type and a-Si film is removed so as to have a certain pattern, thereby forming the channel section 10.

Then, as the protective insulating film 11, $SiN_x$ is layered on via the plasma CVD method at a film formation temperature of 220° C. Then, in the protective insulating film 11, the contact hole 17 is formed for the drain electrode 9 via a step of photolithography.

Next, the interlayer insulating film 12 made of an acrylic photosensitive organic resin is applied on the protective insulating film 11. Then, in the interlayer insulating film 12, a contact hole 18 is formed for the drain electrode 9 via a step of photolithography.

Next, on the interlayer insulating film 12, the Al film is so layered as to have a thickness of $1.5 \times 10^{-5}$ m (1500 Å) by the sputtering method at a heating temperature of 100° C. and under a pressure of 0.1 Pa. Then, via the photolithography method, patterning of the reflective electrode 13 is carried out. Note that the reflective electrode 13 is not limited to Al, and may be patterned by using Ag or an alloy of Ag.

In the present invention, as shown in FIG. 3(a), the reflective electrodes 13 and the transparent electrodes 15 are so patterned, via the different steps, that the reflective electrodes 13 and the transparent electrodes 15 have the same pattern.

However, as shown in FIG. 3(b), it may be arranged that the reflective electrodes 13 are patterned in a direction along which the gate lines 4a are provided.

In this way, in patterning the transparent electrodes 15 later formed, it is possible to pattern the reflective electrodes 13 and the transparent electrodes 15 are patterned by using the same masks, at the same time in a direction along which the source lines 8a are provided.

Next, the color filter layer 14 is formed on the reflective electrode 13. Specifically, after a resist containing a pigment of red (R) is applied, a color filter layer pattern R is formed by the photolithography method. Then, by baking at 200° C., the color filter layer pattern is so melt as to render edges of the color filter layer less tilted.

By rendering edges of the color filter layer less tilted as described above, it is possible to prevent step discontinuity (which will be explained later) of the transparent electrodes 15 due to step-like shaped portions of the color filter layer, and occurrence of domain due to failure in distributing light to liquid crystal molecules.

Specifically, if the color filter layer has a vertically tilted edge (having a tilt angle of 90°), the liquid crystal molecules are not arranged normally at the step-like shaped portions of the color filter layer, thereby causing light leakage at the step portions in which the alignment is not normally performed. Because of this, the edges of the color filter layer are caused to be less tilted, for attaining normal alignment of liquid crystal molecule and preventing the light leakage.

Similarly, resists containing pigments of green (G) and blue (B) are applied, and patterning thereof is performed by the photolithography method. Then, via steps of baking, color filter layer patterns G and B are formed.

Here, as shown in FIG. 3(a), the patterns of the color filter layers 14 are extended in the direction along which the source lines 8a are provided. Further, the patterns of the color filter layers 14 cross the plurality of the reflective electrodes 13. Thus, it is possible to arrange such that the pixel electrodes each formed by including the reflective electrode 13 and transparent electrode 15 have a large effective pixel area.

Further, the patterns of the color filter layers 14 are so formed as to have a narrower width than that of the reflective electrodes 13. Specifically, each color filter layer 14 is so designed as to have a width narrower than that of the reflective electrodes 13 by the alignment margin δx.

Figure 4:
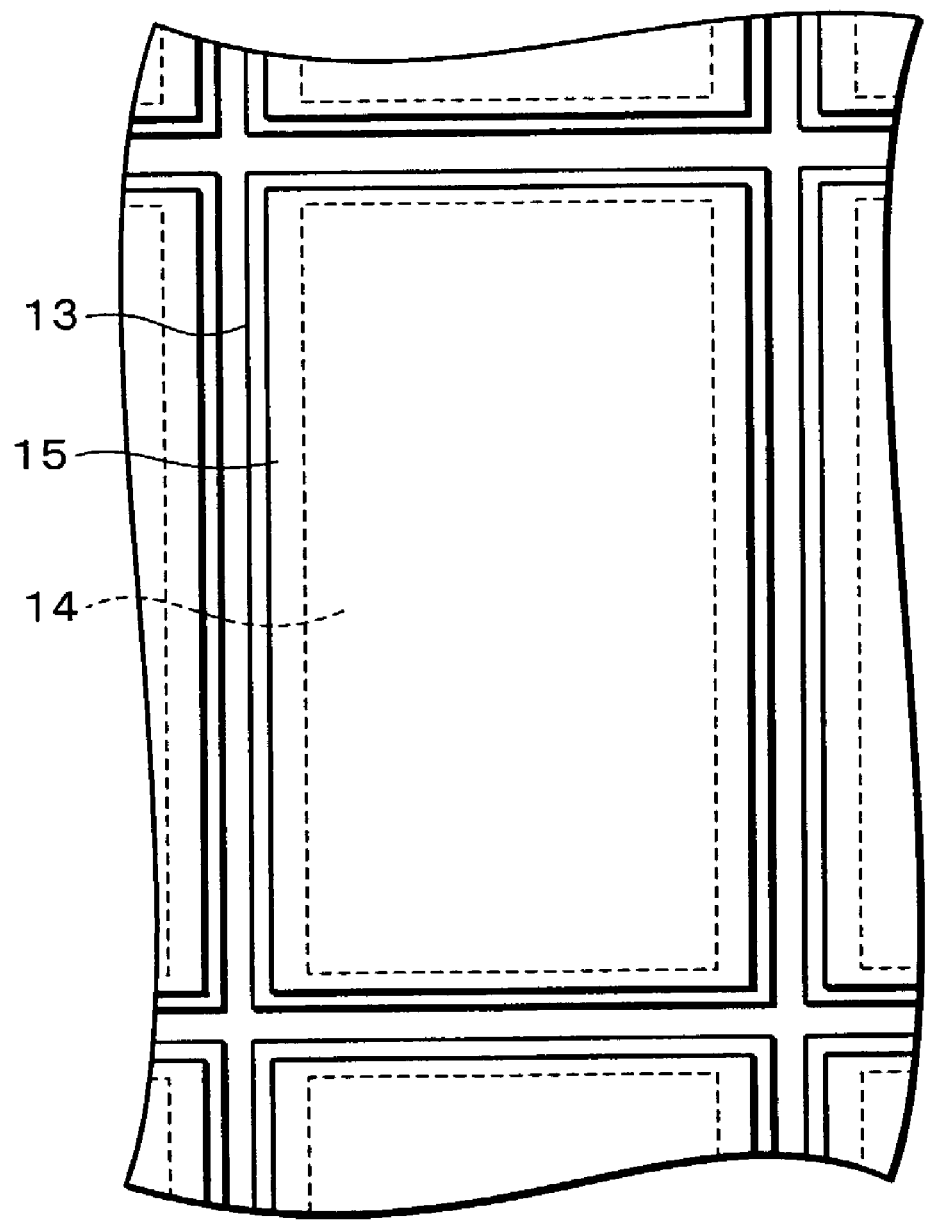
FIG. 4 is a plan view illustrating a case where the color filter layer is formed in a dot pattern, which is smaller than a pixel electrode in the LCD of FIG. 1.

In addition, as shown in FIG. 4, the color filter layers 14 may be so formed have a dot pattern smaller than the pixel electrodes each formed by including the transparent electrode 15 and the reflective electrode 13. This allows the pixel electrodes formed by including the reflective electrode 13 and the transparent electrode 15 to be patterned by using the same mask, thus reducing manufacturing cost.

Thereafter, on the cooler filter layer 14, ITO or the like is layered by the sputtering method. Then, the plurality of the transparent electrodes 15 as the pixel electrodes are formed by the photolithography method, so that the transparent electrodes 15 and the reflective electrodes 13 sandwich the color filter layers 14 therebetween. This electrically connects the transparent electrodes 15 with the reflective electrodes 13 at both ends of the color filter layers 14.

Next, the counter substrate 20 is formed by layering the transparent electrode as the counter electrode 22 on the transparent substrate 21 made of polyether sulfone and having a thickness of 0.2 mm by the sputtering method.

Then, the active matrix substrate 1 and the counter substrate 20 thus produced are pasted together by using an adhesive sealing material. In a gap between the substrates, the liquid crystal 23, for example a TN liquid crystal, is filled in so as to form an LCD.

In this procedure, the LCD of the present embodiment can be manufactured.

Next, the alignment margin δx, which is characteristics of the LCD of the present embodiment, is explained. The alignment margin δx is set to be greater than a product of a size of the substrates and a larger one of the following values (a) to (d):

(a) an amount of that expansion and contraction of the plastic substrate 2, which occur between the step of forming the reflective electrodes 13 and the step of forming the color filter layers of red (R) (the steps are later described);

(b) an amount of that expansion and contraction of the plastic substrate 2, which occur between the step of forming the reflective electrodes 13 and the step of forming the color filter layers of green (G);

(c) an amount of that expansion and contraction of the plastic substrate 2, which occur between the step of forming the reflective electrodes 13 and the step of forming the color filter layers of blue (B); and (d) an amount of that expansion and contraction of the plastic substrate 2, which occur between the step of forming the reflective electrodes 13 and the step of forming the transparent electrodes 15 (pixel electrodes).

Note that the amounts of expansion and contraction of the plastic substrate 2 denote ratios between (i) amounts of change in a distance between a center and an edge of the plastic substrate 2 before and after the processes for the reflective electrodes (the steps of forming the color filter layer and the transparent electrode) and (ii) the distance between the center and the edge of the plastic substrate 2 before the processes for the reflective electrodes.

In the present embodiment, the values (a) to (d) are respectively 45 ppm, 55 ppm. 50 ppm, and 60 ppm. Thus, the value (d) is the maximum. On the other hand, the size of the substrate is as described above 360×465 mm. Thus, the product of the value (d) and the size of the substrate is calculated as follows:

$$232.5 \text{ mm (a distance between the center and edge of the substrate)} \times 10^3 \mu m \times 60 \text{ ppm} \div 10^6 = 13.95 (\mu m)$$

Therefore, it is so arranged that the alignment margin is 15 μm.

The reason why the alignment margin δx is so set is explained below.

Where the substrate is a plastic substrate, the substrate is expanded and contracted greatly during a step of heating and a step of washing, which are included in the process between the step of forming the reflective electrode 13 and the step of forming the transparent electrode 15. The expansion and contraction may cause incorrect positioning between the reflective electrode 13 and the transparent electrode 15. Such incorrect positioning changes the effective pixel area, thereby deteriorating a display image in quality.

However, when the alignment margin δx is set as described above, the alignment margin δx is set to be greater than a incorrect positioning amount between the reflective electrodes 13 and the color filter layers 14 and a incorrect positioning amount between the reflective electrodes 13 and the transparent electrodes 15, which are caused by the expansion and contraction of the plastic substrate 2. In short, it is possible to accurately match the color filter layers 14 respectively with the reflective electrodes 13. Therefore, it is possible to prevent the incorrect positioning between the reflective electrodes 13 and the color filter layers 14, and that between the reflective electrodes 13 and the transparent electrodes 15.

Further, all over a surface of the active matrix substrate 1, the prevention of the incorrect positioning surely maintains the electrical connection between each transparent electrode 15 and each reflective electrode 13, respectively. This also improves the display image in quality.

As described above, an LCD of the present embodiment includes the reflective electrodes 13 on the plastic substrate, the color filter layer 14 on each reflective electrode 13, the transparent electrode 15 on each color filter layer the transparent electrode 15 being electrically connected with the reflective electrodes 13 in the area around the color filter layer 14, wherein a distance (alignment margin) δx from an edge of each reflective electrode 13 to an edge of the color filter layer 14 associated therewith is set based on the expansion and contraction amount (the amount of expansion and contraction) of the plastic substrate 2 during the step of forming the color filter layer 14 and the step of forming the transparent electrode 15.

Moreover, the manufacturing method of the LCD of the present embodiment includes the steps of forming the reflective electrodes 13 on the plastic substrate 2, forming the color filter layer 14 on each reflective electrode 13, forming the transparent electrode 15 on each color filter layer 14, so that the transparent electrodes 15 are electrically connected with the reflective electrode 13 in the area around the color filter layer 14, wherein a distance δx from an edge of each reflective electrode 13 to an edge of the color filter layer 14 associated therewith is set based on the amount of expansion and contraction of the plastic substrate 2, which are caused in the step of forming the color filter layer 14 and the amount of expansion and contraction of the plastic substrate 2, which are caused in the step of forming the transparent electrode 15.

With the above arrangement, the distance from the edge of each reflective electrode 13 to the edge of the color filter layer 14 associated therewith is set based on the amount of the expansion and contraction of the plastic substrate 2, which are caused in the step of forming the color filter layer 14 and the amount of expansion and contraction of the plastic substrate 2, which are caused in the step of forming the transparent electrode 15. Therefore, it is possible to set the distance δx from the edge of each reflective electrode 13 to the edge of the color filter layer 14 associated therewith based on the larger one of the expansion and contraction amount of the plastic substrate 2 in the step of forming the color filter layer 14 and that in the step of forming the transparent electrode 15.

In short, it is possible to set the distance δx from the edge of each reflective electrode 13 to the edge of the color filter layer 14 associated therewith, so that the distance δx is larger than the incorrect positioning amount between the reflective electrode 13 and the color filter layer 14 and the incorrect positioning between the reflective electrode 13 and the transparent electrode 15 due to the expansion and contraction of the plastic substrate 2. In short, it is possible to accurately match the color filter layer 14 and the reflective electrode 13. Therefore, it is possible to prevent the incorrect positioning between the reflective electrode 13 and the color filter layer 14, and the incorrect positioning between the reflective electrode 13 and the transparent electrode 15.

With this arrangement, it is possible to realize, by using the plastic substrate as the substrate, a lighter weight, improved shock resistance, and lower cost, while preventing deterioration of the display image in quality due to the expansion and contraction of the plastic substrate 2.

Moreover, the LCD of the present embodiment is so arranged that the reflective electrodes 13 are provided in matrix on the plastic substrate 2, and each color filter layer 14 is so provided as to cover the reflective electrode 13 that is adjacent therewith along the column direction or the row direction of the matrix of the reflective electrodes 13.

Furthermore, the LCD of the present embodiment is so arranged that the reflective electrodes 13 are provided in matrix on the plastic substrate 2, and the color filter layers 14 are so provided as to cover (overlap) the reflective electrodes 13 (adjacently) aligned in the column direction or the row direction of the matrix of the reflective electrodes 13.

With the above arrangement, it is possible to cover, with the color filter layer 14, more part of the reflective electrode 13. Therefore, it is possible to have a large effective pixel area of the pixel electrode, which is formed by including the reflective electrode 13 and the transparent electrode 15. This further improves the display image in quality.

Moreover, one of the LCDs of the present embodiment may be so arranged that the color filter layer 14 is so formed on each reflective electrode 13 as to have a pattern smaller than that of the reflective electrode 13.

With the above arrangement, the color filter layer 14 is formed on each reflective electrode 13 as to have a pattern smaller than that of the reflective electrode 13. Therefore, it is possible to carry out the patterning of the reflective electrodes 13 and the transparent electrode 15 by using the same mask. This reduces the manufacturing cost of the LCD.

Moreover, the manufacturing method of the LCD of the present embodiment is so arranged that the reflective electrode 13 and the transparent electrode 15 are patterned by using a same mask.

With the above arrangement, the reflective electrode 13 and the transparent electrode 15 are patterned by using the same mask. This reduces the manufacturing cost of the LCD.

[Second Embodiment]

Another embodiment of an LCD of the present invention is explained below, referring to figures. Note that the present invention is not limited to the another embodiment. It is possible to appropriately combine characteristics of the first embodiment and those of the second embodiment.

To begin with, referring to FIGS. 5 and 6, a structure of the LCD of the present embodiment of the present invention will be explained. Note that the LCD has a plurality of pixel areas arranged in matrix.

Moreover, in the present Specification, the word "pixel area" denotes that area of the LCD which corresponds to a pixel, which is a minimum unit of image display. In an LCD of the active matrix type, the pixel areas are defined by pixel electrodes and a counter electrode, which faces the pixel electrodes. On the other hand, in an LCD of the passive matrix type, the pixel areas are defined by intersections between column electrodes (signal electrodes) and row electrodes (scanning electrodes). The column electrodes and the row electrodes are arranged in stripe.

Figure 5:
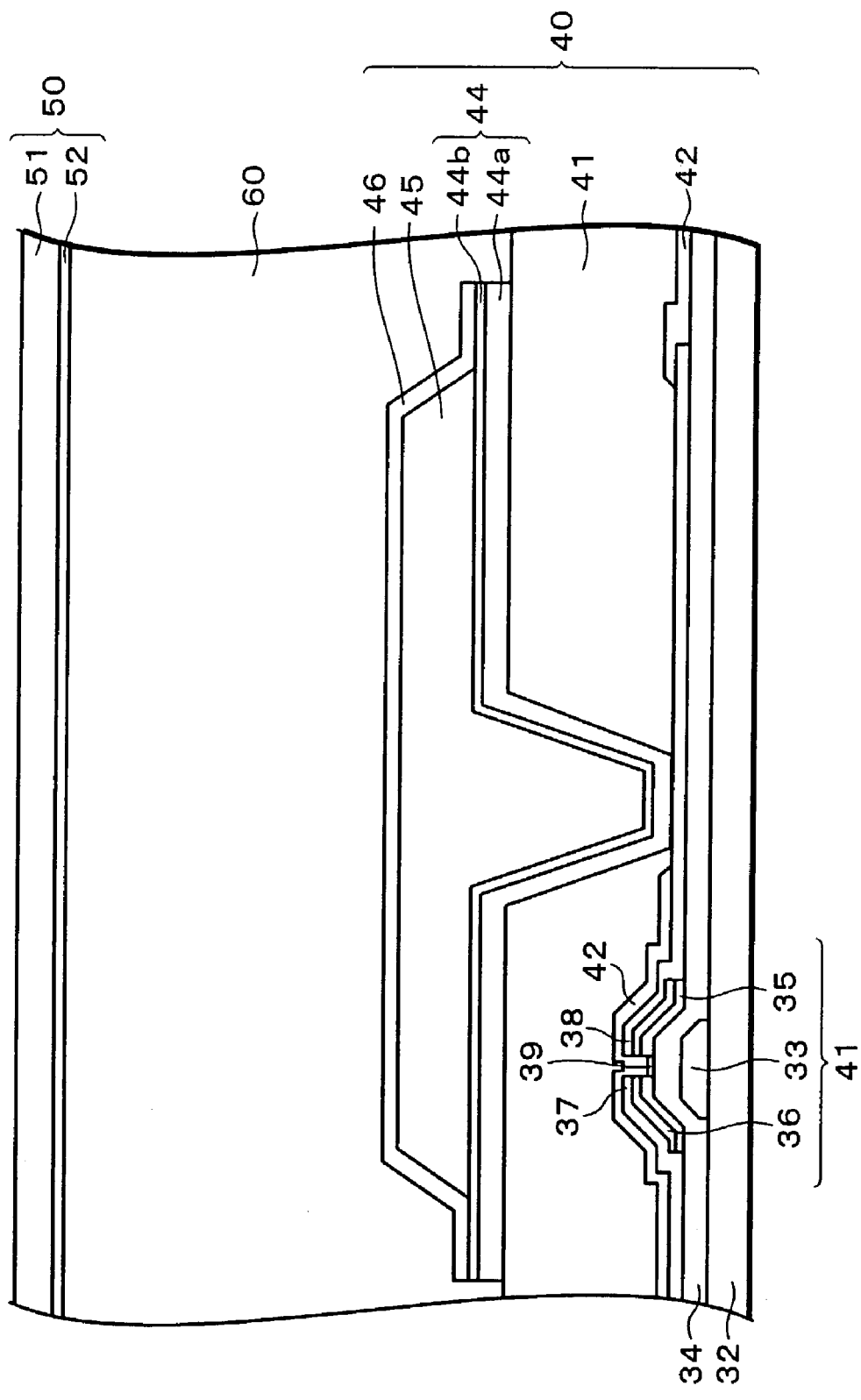
FIG. 5 is a cross-sectional view illustrating another embodiment of an LCD of the present invention.
Figure 6:
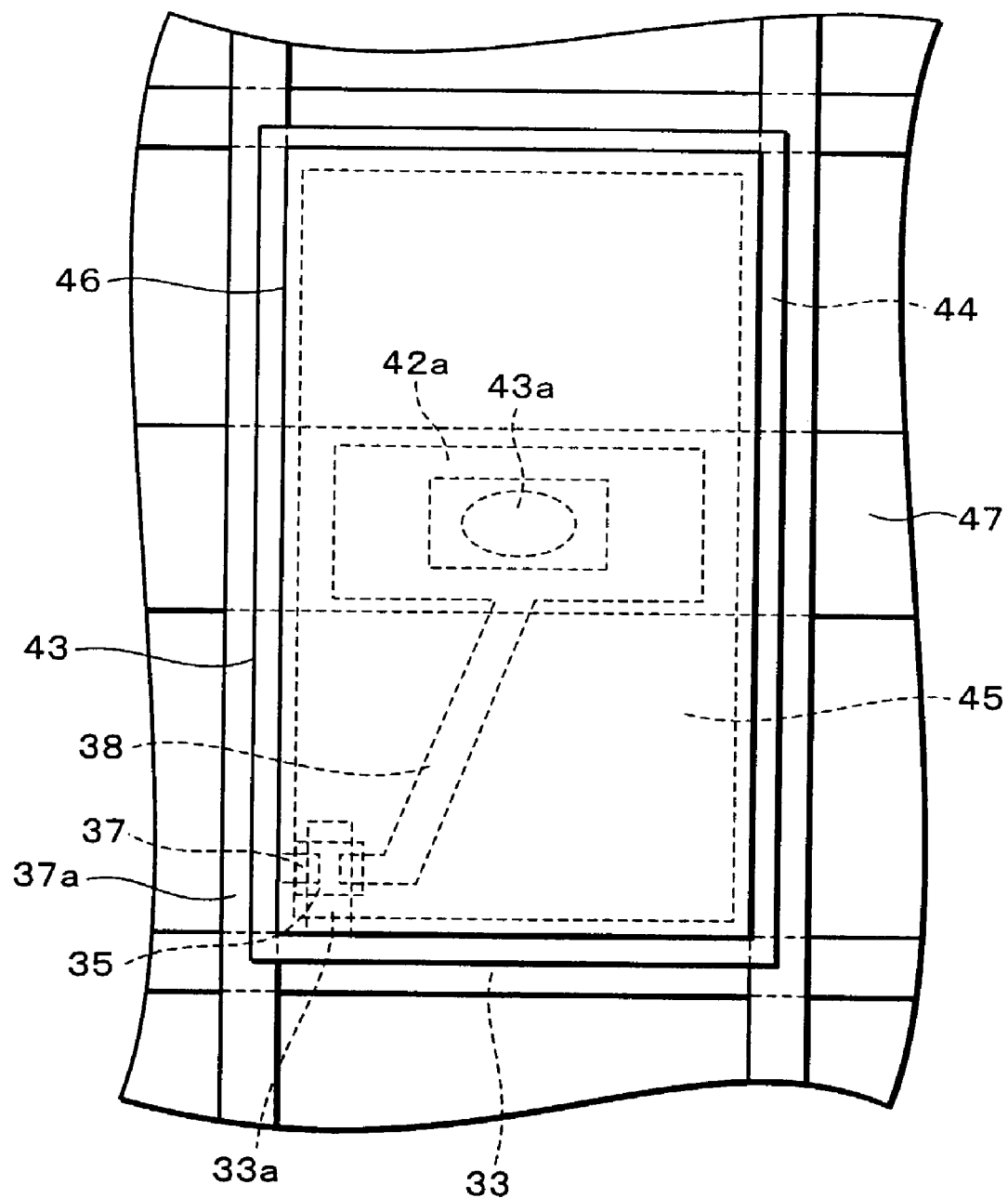
FIG. 6 is a plan view of the LCD of FIG. 5.

The LCD is, as shown in FIG. 5, provided with an active matrix substrate (hereinafter, just referred to as a "TFT substrate") 40, a counter substrate 50, and a liquid crystal layer 60 located therebetween.

In the TFT substrate 40, a thin film transistor (TFT) 11 as a switching element, a reflective electrode 44, a color filter layer 45 formed on the reflective electrode 44, and a transparent electrode 46 formed on the color filter layer 45 are provided per pixel area.

A structure of the TFT substrate 40 is described in detail below. The TFT substrate 40 is provided with an insulating substrate 32. On the insulating substrate 32, the TFT substrate 40 is provided with, per pixel area, the gate line 33, a gate electrode 33a, a supplement capacity line 47, and the like. Further, a gate insulating film 34 is so formed as to cover those members. An intrinsic semiconductor layer 35, a conductive semiconductor layer 36, a source electrode 37a, and a drain electrode 38 are formed on the gate insulating film 34, which is positioned on the gate electrode 33a. In this way, a TFT 41 is structured.

Note that the gate electrode 33a, the source electrode 37a, and the drain electrode 38 of the TFT 41 are electrically connected with the gate line 33, the source line 37, and the reflective electrode 44, respectively. Moreover, the conductive semiconductor layer 36 is formed on the intrinsic semiconductor layer 35, and separated by a channel section 9.

Moreover, a protective insulating film 42 is so formed as to cover the TFT 41. Further, on the protective insulating film 42, an interlayer insulating film 43 is so formed as to cover an almost whole surface of the insulating substrate 32.

On the interlayer insulating film 43, a reflective electrode 44 is formed. In the LCD of the present embodiment, each reflective electrode 44 is, as shown in FIG. 5, provided with a metal layer 44a and a transparent conductive layer 44b formed on the metal layer 44a. Moreover, the metal layer 44a of the reflective electrode 44 is in contact with the drain electrode 38 via contact holes 42a and 43a (see FIG. 6) respectively formed in the protective insulating film 42 and the interlayer insulating film 43. This electrically connects the reflective electrodes 44 with the TFT 41.

Moreover, on the transparent conductive layer 44b above the reflective electrode 44, a color filter layer 45 is so formed as to cover the reflective electrode 44. The color filter layer 45 is typically a red layer, a green layer, or a blue layer.

Moreover, on the color filter layer 45, a transparent electrode 46 is so formed as to cover the color filter layer 45.

The counter substrate 50 is, as shown in FIG. 5, provided with a transparent insulating substrate 51 and a counter electrode 52 formed on the transparent insulating substrate 51. As the counter electrode 52, for example, it is possible to use a single common electrode which is connected to each pixel. The counter electrode 52 is a transparent electrode made of Indium Tin Oxide (ITO).

The TFT substrate 40 and the counter substrate 50 are pasted together (panel alignment) via a sealing material provided around a display area in which the plurality of pixel areas are provided. Note that, even though it is not shown here, alignment films made of a polyimide resin or the like are formed on those surfaces of the TFT substrate 40 and the counter substrate 50 which face the liquid crystal layer 60.

The LCD having the above arrangement is a reflective LCD that performs display by utilizing light entering from that side of the LCD (counter substrate 50-side) on which the counter substrate 50 is provided, and being reflected by the reflective electrodes 44. Peripheral light (external light) entering from the counter substrate 50-side passes through the liquid crystal layer 60 and reflected by the reflective electrodes 44. Then, the peripheral light passes through the liquid crystal layer 60 again and outgoes from the counter substrate 50. Thereby, image display is performed.

Next, how the LCD is manufactured is explained.

To begin with, the TFT substrate 40 is produced as follows. The insulating substrate 32 is prepared and the plurality of TFTs 41 are formed on the insulated substrate 32. This formation of the TFTs 41 on the insulating substrate 32 may be carried out by adopting a well-known raw material and by a well-known method.

For example, firstly by the sputtering method, a metal film made of Al is formed on the insulating substrate 32 that is made of glass. The metal film is so formed as to have a thickness of about 200 nm. Then, the metal film is subjected to a photolithography process and pattering, so as to pattern the metal film. Thereby, gate lines 33, gate electrodes 33a and supplement capacitor lines 47 are formed. Note that the metal film is not limited to Al, and may be made of an Al alloy, Ta, TaN/Ta/TaN, Ti/Al/Ti, or the like.

Next, per pixel area, the gate insulating film 34 made of $SiN_x$ is formed by the plasma CVD method on the gate line 33, the gate electrode 33a, and the supplement capacitor line 47.

Next, on the gate insulating film 34, a non-doped a-Si film and an a-Si film of n+ type into which P is doped are deposited sequentially by the plasma CVD method. Thereafter, through a photolithography process and patterning, an island-like shapes are patterned, thereby forming the intrinsic semiconductor layer 35 and the conductive semiconductor layer 36, per pixel area.

Further, on the gate insulating film 34 on which the intrinsic semiconductor layer 35 and the conductive semiconductor layer 36 are formed, a metal film made of Ti is formed by the sputtering method. Then, via a photolithography process and patterning, the metal film is patterned, thereby forming the source line 37, the source electrode 37a and the drain electrode 38. Note that a raw material of the metal film is not limited to Ti, and may be Mo, Al/Ti, Ag, or the like.

Next, by using the source electrode 37a and the drain electrode 38 as masks, portion above the conductive semiconductor layer 36 and the intrinsic semiconductor layer 35 is removed by patterning, thereby forming a channel section 39.

Next, by using the plasma CVD method, the protective insulating film 42 made of $SiN_x$ is formed on the source electrode 37a and the drain electrode 38. Then, via a photolithography process, a contact hole 42a is formed at that position in the protective insulating film 42, which corresponds to where the drain electrode 38 is.

Thereafter, an acrylic photosensitive organic resin is applied on the protective insulating film 42, thereby forming the interlayer insulating film 43. Then, via a photolithography process, a contact hole is formed at that position in the interlayer insulating film 43, which corresponds to where the drain electrode 38 is.

In this way, it is possible to form the TFT 41 on the insulating substrate 32. After the formation of the TFT 41 on the insulating substrate 32, the following steps are carried out, which are explained below referring to FIGS. 7(a) to 7(d) and 8(a) to 8(d).

Figure 7:
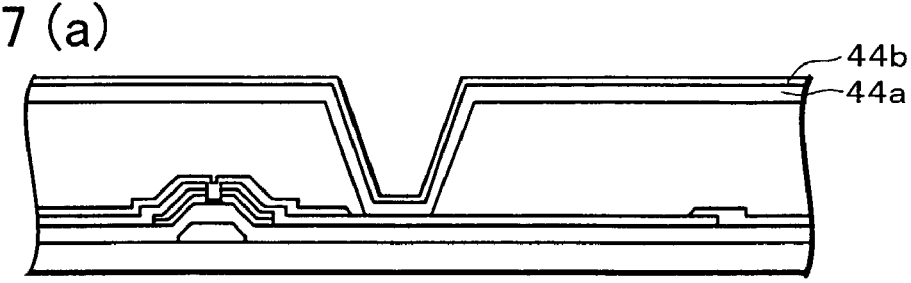
FIGS. 7(a) to 7(d) are views illustrating steps of forming a color filter layer on the LCD of FIG. 5.
Figure 7:
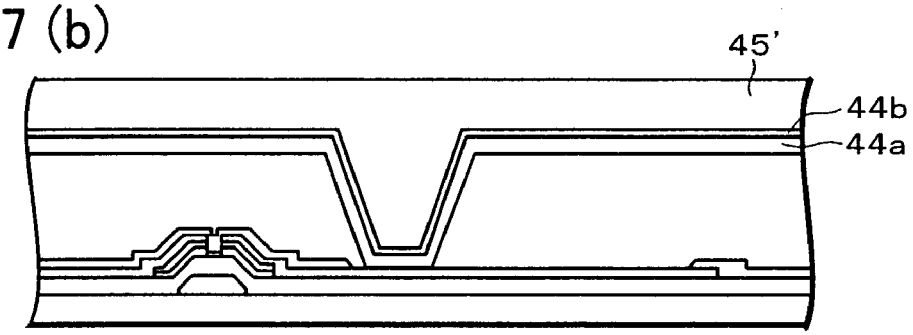
Figure 7:
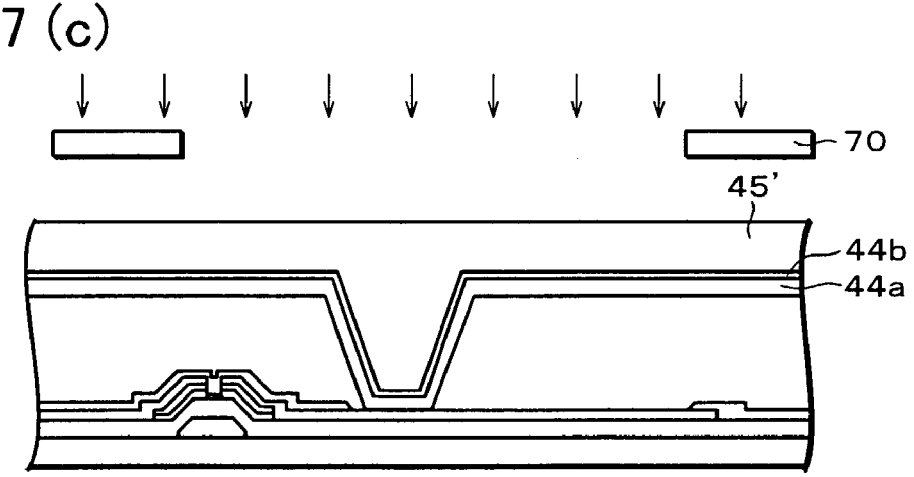
Figure 7:
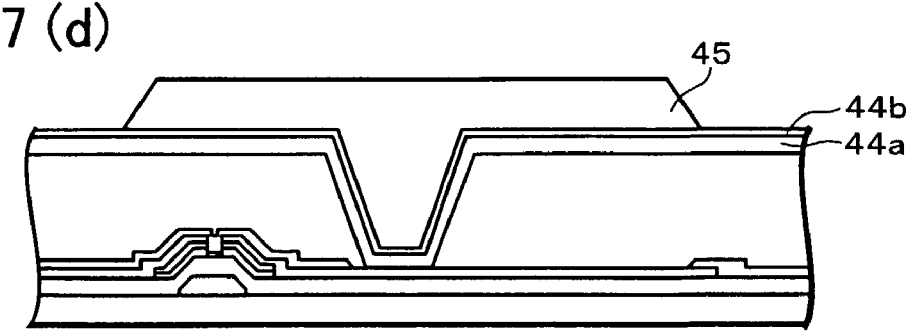

To begin with, as shown in FIG. 7(a), per pixel area, the metal layer 44a is formed on the substrate 32 on which the interlayer insulating film 43 is formed. Then, on the metal layer 44a, the transparent conductive layer 44b is formed thereby forming the reflective electrode 44.

For example, at room temperatures under a pressure of 0.1 Pa, by using the sputtering method, an Al film as the metal layer 44a is so deposited as to have a thickness of 100 nm and then an IZO film as the transparent conductive layer 44b is so deposited as to have a thickness of 10 nm. Thereby, the reflective electrode 44 is formed.

Note that IZO is a hexagonal lamellar compound represented as $In_2O_3$-ZnO (its composition ratio is 90:10 wt %). By depositing the compound at room temperatures by the sputtering method, an amorphous film is easily obtained.

Next, per pixel area, a color filter layer 45 is formed on the reflective electrode 44. For example, as shown in FIG. 7(b), a resist layer 15' (which is a negative type resist layer) containing a red pigment is formed on the reflective electrode 44. Next, as shown in FIG. 7(c), a resist layer 45' is exposed with a photo mask 70. Then, development is carried out by using a developer (such as potassium hydroxide aqueous solution). After that, baking is carried out. Thereby, a color filter layer 45 of red in is formed, as shown in FIG. 7(d).

Similarly, a color filter layer 45 of green can be formed through steps of forming a resist layer containing a green pigment, patterning the resist layer via a photolithography process, and baking the thus patterned resist layer. Moreover, a color filter layer 45 of blue can be formed in a similar fashion.

Note that the formation of the color filter layer 45 can be performed by the pigment diffusing method, dying method, ink jet method, laminating method, and the like.

Figure 8:
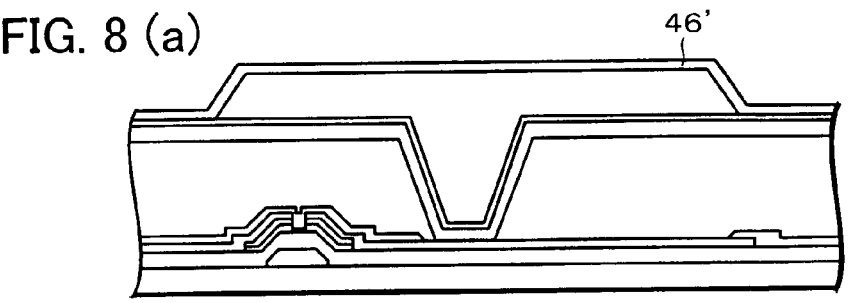
FIGS. 8(a) to 8(d) are views illustrating steps of forming a transparent electrode on the LCD of FIG. 5.
Figure 8:
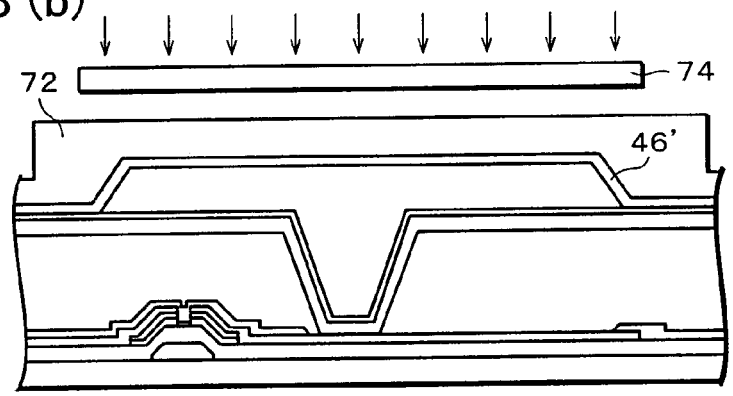
Figure 8:
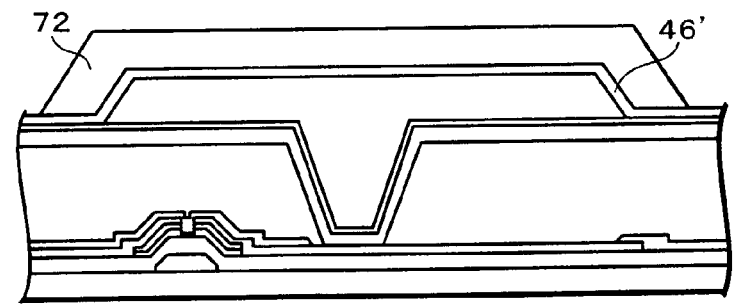
Figure 8:
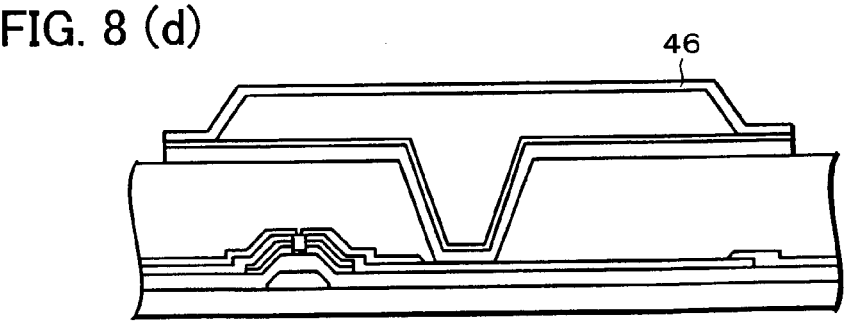

Then, the transparent electrode 46 to be electrically connected with the reflective electrode 44 is formed on the color filter layer 45. For example, firstly as shown in FIG. 8(a), IZO is deposited on the color filter layer 45 by the sputtering method, thereby forming a transparent electrode 46'. The transparent electrode 46 is electrically connected with the reflective electrode 44 in an area around the color filter layer 45.

Next, as shown in FIG. 8(b), photo resist 72 is applied on each transparent electrode 46', and the photo resist 72 is exposed with a photo mask 74. Then, as shown in FIG. 8(c), development is carried out, so at to perform patterning of the photo resist 72 so that each color filter layer 45 is overlapped by the photo resist 72.

Then, patterning is carried out by using the photo resist 72 as a mask, whereby as shown in FIG. 8(d) the transparent electrode 46 is formed per pixel area, the transparent electrode 46 being independent electrically.

The transparent electrode 46 is touched with the transparent conductive layer 44b of the reflective electrode 44 via the contact hole 45a formed in the color filter layer 45, whereby the transparent electrode 46 is electrically contacted with the reflective electrode 44. Note that in patterning the transparent electrodes 46, for example, at 40° C. and by using a mixture solution of phosphoric acid: nitric acid: acetic acid, the transparent electrodes 46, the metal layers 44a, and the transparent conductive layers 44b are patterned at the same time by using the same mask (here, the photo resist 72) as the metal layers 44a and the transparent conductive layers 44b, which constitute the reflective electrodes 44.

In this way, the TFT substrate 40 is formed.

It is possible to produce the counter electrode 50 by using a well-known raw material and a well-known method, similarly to the counter substrate provided to a well-known LCD of the active matrix type. For example, the counter substrate 50 may be produced by forming, on the transparent insulating substrate 51 made of glass and having a thickness of 0.7 mm, the transparent electrodes (for example, an ITO film) via the sputtering method so as to form the counter electrode 52.

The TFT substrate 40 and the counter substrate 50 thus prepared are pasted together by using an adhesive sealing material, and then a liquid crystal raw material (for example, a well-known raw material for TN mode) is filled and sealed between the substrates, so as to form the liquid crystal layer 60, thereby producing the LCD. Note that if necessary aliment film made of polyimide resin or the like is formed on those surfaces of the TFT substrate 40 and the counter substrate 50 which face the liquid crystal layer 60.

The LCD of the present embodiment, which is produced as described above, gives the following effects.

In the reflective LCD, in many cases aluminum or an aluminum alloy is used as the raw material for the metal layer that functions as the reflective electrode, because aluminum and the aluminum alloy have high reflectivity, excellent patterning property, and low electrical resistance.

If an aluminum layer or an aluminum alloy layer is used as the metal layer, and the color filter layer is formed via the photolithography process, during the development of the color filter layer the metal layer is eroded by the developer, which is alkali, because the color filter layer is formed directly on the metal layer that functions as the reflective electrode. Display quality would be deteriorated if the metal layer was eroded as such so that part thereof became missing to reduce an area of the reflective electrode, or so that the color filter layer itself became missing.

Moreover, the transparent electrode formed on each color filter layer is electrically connected with the reflective electrode in the area around the color filter layer.

If an aluminum layer or an aluminum alloy layer is used as the metal layer, however, the electric connection between the transparent electrodes and reflective electrodes are often deteriorated because those metals are oxidized easily. Thus caused insufficient electric connection renders the LCD less reliable.

However, in the LCD of the present embodiment, as shown in FIG. 5, each reflective electrode 44 includes the metal layer 44a and the transparent conductive layer 44b formed on the metal layer 44a. Thus, the color filter layer 45 formed on each reflective electrode 44 is not formed directly on the metal layer 44a, but on the transparent conductive layer 44b. Therefore, even if the color filter layers 45 are formed by using the photolithography process, it is possible to suppress the erosion of the metal layers 44a due to the developer.

Thus, even if a raw material susceptible to the developer and erosive is used for the metal layers 44a, it is possible to suppress deterioration of the display quality due to such erosion as to render the metal layers 44a partially missing, or to render the color filter layers 45 missing.

Further, each reflective electrode 44 is provided with the transparent conductive layer 44b. The transparent electrode 46 is electrically connected with the reflective electrode 44 via the transparent conductive layer 44b. Thus, even if a corrosive raw material is used for the metal layer 44a, it is possible to realize good electric connection between the transparent electrode 46 and the reflective electrode 44. Thereby, reliability of the LCD as a device is improved.

As described above, the LCD of the present embodiment is so arranged that the metal layers 44a of the reflective electrodes 44 may be suitably made of aluminum or an aluminum alloy having high reflectivity, excellent patterning property, and low electrical resistance. In short, as described above, the LCD of the present embodiment is so arranged that display quality and reliability will not be deteriorated even in use of the aluminum or the aluminum alloy, which is easily oxidized and which is easily eroded by the developer used in the photolithography process.

In view of easy manufacturing and further improvement of the display quality, it is preferable that the transparent conductive layer 44b formed on each metal layer 44a has a thickness in a range of not less than 1 nm and not more than 20 nm. If the thickness of the transparent conductive layer 44b is less than 1 nm, it is difficult to form the transparent conductive layer 44b evenly by the sputtering method. If the thickness of the transparent conductive layer 44b is more than 20 nm, there is a risk that transmittance of light of low wavelength is lowered to 80% or less, thereby deteriorating reflectively or casing a coloring problem.

Further, the transparent conductive layer 44b may be a crystalline layer, or an amorphous layer. Especially, if the transparent conductive layer 44b is an amorphous layer, it is possible to pattern the transparent conductive layer and the metal layer at the same time, by using an etchant for patterning the metal layer.

Moreover, the transparent electrode 46 may be a crystalline layer or an amorphous layer. Especially, if the transparent electrode 46 is an amorphous layer, it is possible to pattern, the transparent electrode, the transparent conductive layer and the metal layer at the same time, by using the etchant for patterning the metal layer.

Further, as the raw materials of the transparent conductive layer 44b and the transparent electrode 46, it is possible to use ITO, IZO, or the like. When IZO is used as the raw materials, IZO is deposited by the sputtering method at room temperature, thereby attaining stable formation of the amorphous transparent electrode. Thus, the use of IZO as the raw materials of the transparent conductive layer 44b or the transparent electrode 46, it is possible to easily obtain the amorphous transparent conductive layer 44b and the amorphous transparent electrode 46.

Moreover, the LCD of the present invention may be so arranged that the color filter layers have a stripe pattern and cross the plurality of the reflective electrodes.

By so forming the color filter layers as to have a stripe pattern and to cross the plurality of reflective electrode, it is possible to attain a larger effective pixel area.

Moreover, the LCD of the present invention may be so arranged that the distance from an edge of each reflective electrode to an edge of the color filter layer associated therewith is greater than larger one of (i) an amount of expansion and contraction of the substrate, which are caused in a step of forming the color filter layer, (ii) an amount of expansion and contraction of the substrate, which are caused in a step of forming the pixel electrode.

In other words, the LCD of the present invention may be so arranged that the distance from an edge of each reflective electrode to an edge of the color filter layer associated therewith is equal to the larger one of the expansion and contraction amount of the substrate during the step of forming the color filter layer, and the expansion and contraction amount of the substrate during the step of the forming of the transparent electrode. With this arrangement, it is possible to prevent the incorrect positioning (failure in alignment) due to the expansion and contraction of the substrate, which are caused during the thermal process in the steps of forming the color filter layer and the transparent electrode on each reflective electrode. At the same time, it is possible to attain a larger effective pixel area.

Moreover, in order to solve the problems, the LCD of the present invention having the above arrangement may be so arranged that a distance between an edge of the reflective electrode and an edge of the color filter layer is set based on an amount of expansion and contraction of the substrate, which are caused in a step of forming the color filter layer and an amount of expansion and contraction of the substrate, which are caused in a step of forming the transparent electrode.

Moreover, in order to solve the foregoing problems, the manufacturing method of the present invention having the above arrangement may be so arranged that a distance between an edge of the reflective electrode and an edge of the color filter layer is set based on an amount of expansion and contraction of the substrate, which are caused in a step of forming the color filter layer and an amount of expansion and contraction of the substrate, which are caused in a step of forming the transparent electrode.

In this arrangement, it is so arranged that the distance between the edge of the reflective electrode and the edge of the color filter layer is set based on the amount of expansion and contraction of the substrate, which are caused in the step of forming the color filter layer and the amount of expansion and contraction of the substrate, which are caused in the step of forming the transparent electrode. Therefore, it is possible to set the distance between the edge of the reflective electrode and the edge of the color filter layer based on the larger one of (i) the amount of expansion and contraction of the substrate, which are caused in the step of forming the color filter layer, and (ii) the amount of expansion and contraction of the substrate, which are caused in the step of forming the pixel electrode.

In short, even if the plastic substrate is used as the substrate, it is possible to arrange such that the distance between the edge of the reflective electrode and the edge of the color filter layer is greater than an amount of the incorrect positioning between the reflective electrode and the color filter layer due to the expansion and contraction of the substrate, and an amount of the incorrect positioning between the reflective electrode and the transparent electrode due to the expansion and contraction of the substrate.

In other words, it is possible to have such a design that the color filter layers have such a margin as to have allowance for such incorrect positioning due to the expansion and contraction of the substrate. Therefore, it is possible to match the color filter layers on the reflective electrodes without incorrect positioning. Thus, it is possible to prevent the incorrect positioning between the reflective electrodes and the color filter layers, and the incorrect positioning between the reflective electrodes and the transparent electrodes.

This arrangement realizes, by using the plastic substrate as the substrate, an LCD having a lighter weight improved shock resistance, and lower cost while preventing deterioration of the display image in quality due to the expansion and contraction of the substrate.

Moreover, an LCD of the present invention may be so arranged as to include a plurality of pixels arranged in matrix, the plurality of pixels respectively being associated with the reflective electrodes; the color filter layers overlapping the reflective electrodes, with which the color filter layers are aligned in a column direction or a row direction of the plurality of pixels. Alternatively, an LCD of the present invention may be so arranged that the reflective electrodes are provided in matrix on the substrate; and the color filter layers overlaps the reflective electrodes, with which the color filter layers are aligned in a column direction or a row direction of the reflective electrodes.

Furthermore, an LCD of the present invention may be so arranged as to include a plurality of pixels arranged in matrix, the plurality of pixels respectively being associated with the reflective electrodes; the color filter layers overlapping the reflective electrodes (adjacently) aligned in a column direction or a row direction of the plurality of pixels. Alternatively, an LCD of the present invention may be so arranged that the reflective electrodes are provided in matrix on the substrate; and the color filter layers overlaps the reflective electrodes (adjacently) aligned in a column direction or a row direction of the reflective electrodes.

With the above arrangement, it is possible to cause the color filter layer to cover more part of the reflective electrode. Therefore, it is possible to have a large effective pixel area of the pixel electrode formed by including the reflective electrode and the transparent electrode. Here, the word "effective pixel area" denotes an area that is displayed as one pixel. Specifically, the word "effective pixel area" is an area of projection of the color filter layer on the reflective electrode (projected area). This arrangement improves the quality of the display image.

Moreover, in order to solve the problems, the LCD of the present invention may be so arranged that the color filter layer has a pattern smaller than that of the reflective electrode.

With this arrangement, in which the color filter layer has a pattern smaller than that of the reflective electrode, it is possible to pattern the reflective electrode and the transparent electrode by using the same mask.

This reduces the manufacturing cost of the LCD.

Furthermore, in order to solve the foregoing problems, the LCD of the present invention having the above arrangement may be so arranged that the substrate is a plastic substrate.

The plastic substrate is more greatly expanded and contracted during the step of forming the color filter layer. Therefore, according to the arrangement, it is possible to prevent the incorrect positioning due to the expansion and contraction caused by humidity and thermal process in forming the color filter layer on each reflective electrode on the plastic substrate. Thus, it is possible to prevent overlapping of colors of the color filter layers and overlapping of pixels, thereby realizing an LCD free from color blurring.

Moreover, the manufacturing method of the LCD of the present invention having the above arrangement, may be so arranged that the reflective electrode and the transparent electrode are patterned by using a same mask.

According to the arrangement, in which the reflective electrode and the transparent electrode are patterned by using the same mask, it is possible to lower the manufacturing cost of the LCD.

The present invention is not to limited to the embodiments and may be modified in various ways within the scope of the invention, and include, within its technical scope, various combinations of the technical means respectively disclosed in the embodiments.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A liquid crystal display apparatus, comprising:
    a reflective electrode on a substrate;
    a color filter on the reflective electrode;
    a transparent electrode on the color filter, the transparent electrode being electrically connected with the reflective electrode in an area around at least part of the color filter; and
    wherein a distance between an edge of the reflective electrode and an edge of the color filter is greater than a product of (i) a distance between the center of the substrate and an edge of the substrate, and (ii) an amount of expansion or contraction of the substrate during formation of the transparent electrode.

2. The liquid crystal display apparatus as set forth in claim 1, comprising:
    a plurality of pixels arranged in matrix, the plurality of pixels being associated respectively with a plurality of the reflective electrodes, the color filters overlapping the reflective electrodes, with which each color filter is respectively aligned in a column direction or a row direction of the pixels.

3. The liquid crystal display apparatus as set forth in claim 1, wherein:
    the reflective electrodes are provided in matrix on the substrate; and
    the color filters overlap the reflective electrodes, with which the color filters are aligned in a column direction or a row direction of the reflective electrodes.

4. The liquid crystal display apparatus as set forth in claim 1, wherein, as viewed from above, the color filter has a width smaller than that of the reflective electrode.

5. The liquid crystal display apparatus as set forth in claim 1, wherein the substrate is a plastic substrate.

6. The liquid crystal display apparatus as set forth in claim 1, wherein the reflective electrode includes a metal layer and a transparent conductive layer formed on the metal layer.

7. The liquid crystal display apparatus as set forth in claim 1, comprising:
    a pixel electrode including the reflective electrode and the transparent electrode, wherein as viewed from above, the color filter has a width smaller than that of the pixel electrode.

8. The liquid crystal display apparatus as set forth in claim 7, wherein: right and left edge portions of the color filter are formed to have alignment margins $\delta x$ from right and left edges of the pixel electrodes, where each alignment margin $\delta x$ is a distance between an edge of the reflective electrode and that of the color filter.

9. The liquid crystal display apparatus as set forth in claim 8, wherein: each alignment margin $\delta x$ is greater than a larger one of (i) an amount of expansion and contraction of the substrate, which are caused in a step of forming the color filter, and (ii) an amount of expansion and contraction of the substrate, which are caused in a step of forming the pixel electrode.

10. The liquid crystal display apparatus as set forth in claim 9, wherein: each amount of expansion and contraction is a ratio between (i) an amount of change in a distance between a center and an edge of the substrate before and after the steps of forming the color filter and pixel electrode and (ii) the distance between the center and the edge of the substrate before the steps of forming the color filter and pixel electrode.

11. The liquid crystal display apparatus of claim 1, wherein substantially the entire transparent electrode is over the reflective electrode, and the reflective electrode is substantially covered by the transparent electrode.

12. The liquid crystal display apparatus of claim 1, wherein the reflective electrode is electrically connected to a switching element provided on the substrate, and the transparent electrode is electrically connected to said switching element via the reflective electrode.

13. The liquid crystal display apparatus of claim 1, wherein the display apparatus is a reflective liquid crystal display apparatus.

14. The liquid crystal display apparatus of claim 1, wherein the transparent electrode is electrically connected with the reflective electrode in an area around at least part of the color filter so that the transparent electrode extends downward along opposing sidewalls of the color filter and is electrically connected to the reflective electrode at least at opposing peripheral sides of the color filter.

15. The liquid crystal display apparatus of claim 1, wherein the transparent electrode extends downward along all sidewalls of the color filter and is electrically connected to the reflective electrode on all peripheral sides of the color filter.

16. A liquid crystal display apparatus, comprising:
    reflective electrodes on a substrate;
    a color filter on each reflective electrode;
    a transparent electrode on each color filter, each transparent electrode being electrically connected respectively with the reflective electrode associated therewith, in areas around at least part of the color filter associated; and
    wherein a distance between an edge of each reflective electrode and an edge of the color filter associated therewith is greater than a product of (i) a distance between the center of the substrate and an edge of the substrate, and (ii) an amount of expansion or contraction of the substrate during formation of the transparent electrodes.

17. The liquid crystal display apparatus as set forth in claim 16, wherein, as viewed from above, the color filters each have a width and/or surface area smaller than that of the corresponding reflective electrodes.

18. The liquid crystal display apparatus as set forth in claim 16, wherein the substrate is a plastic substrate.

19. The liquid crystal display apparatus as set forth in claim 16, wherein the reflective electrode includes a metal layer and a transparent conductive layer formed on the metal layer.

20. The liquid crystal display apparatus as set forth in claim 16, comprising:
a plurality of pixel electrodes, each of which includes one of the reflective electrodes and one of the transparent electrodes, the color filters having width smaller than that of the pixel electrodes.

21. The liquid crystal display apparatus as set forth in claim 20, wherein: right and left edge portions of the color filters are formed to have alignment margins δx from right and left edges of the pixel electrodes, where each alignment margin δx is a distance between an edge of one of the reflective electrodes and that edge of the color filter which is associated with the edge of the one of the reflective electrodes.

22. The liquid crystal display apparatus as set forth in claim 21, wherein: each alignment margin δx is greater than a larger one of (i) an amount of expansion and contraction of the substrate, which are caused in a step of forming the color filters, and (ii) an amount of expansion and contraction of the substrate, which are caused in a step of forming the pixel electrodes.

23. The liquid crystal display apparatus as set forth in claim 22, wherein: each amount of expansion and contraction is a ratio between (i) an amount of change in a distance between a center and an edge of the substrate before and after the steps of forming the color filters and pixel electrodes and (ii) the distance between the center and the edge of the substrate before the steps of forming the color filters and pixel electrodes.

24. The liquid crystal display apparatus of claim 16, wherein substantially the entire transparent electrode is over the reflective electrode, and the reflective electrode is substantially covered by the transparent electrode.

25. The liquid crystal display apparatus of claim 16, wherein the reflective electrode is electrically connected to a switching element provided on the substrate, and the transparent electrode is electrically connected to said switching element via the reflective electrode.

26. The liquid crystal display apparatus of claim 16, wherein the display apparatus is a reflective liquid crystal display apparatus.

27. A liquid crystal display, comprising:
a thin film transistor (TFT) provided on a substrate, the TFT in communication with a source line and a gate line which cross each other on the substrate;
a reflective electrode on the substrate and in electrical communication with a drain of the thin film transistor;
a color filter on the substrate and provided over at least the reflective electrode;
a transparent electrode on the substrate and provided over at least the color filter and at least part of the reflective electrode, the transparent electrode being electrically connected to the reflective electrode in an area outside at least part of a peripheral edge of the color filter; and
wherein a distance between an edge of the reflective electrode and an edge of the color filter is greater than a product of (i) a distance between the center of the substrate and an edge of the substrate, and (ii) an amount of expansion or contraction of the substrate during formation of the transparent electrode.

28. The display of claim 27, wherein each of the reflective electrode and the transparent electrode overlap at least part of the TFT.

29. The display of claim 27, wherein the color filer overlaps at least part of the TFT.

30. The liquid crystal display apparatus of claim 27, wherein the reflective electrode is electrically connected to a switching element provided on the substrate, and the transparent electrode is electrically connected to said switching element via the reflective electrode.

31. The liquid crystal display apparatus of claim 27, wherein the display apparatus is a reflective liquid crystal display apparatus.

* * * * *